(12) United States Patent
Toyoda et al.

(10) Patent No.: US 8,693,794 B2
(45) Date of Patent: Apr. 8, 2014

(54) IMAGE PROCESSING APPARATUS AND IMAGE PROCESSING METHOD

(71) Applicant: Fujitsu Limited, Kawasaki (JP)

(72) Inventors: Yuushi Toyoda, Kawasaki (JP); Masayoshi Shimizu, Hadano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/753,561

(22) Filed: Jan. 30, 2013

(65) Prior Publication Data

US 2013/0142449 A1    Jun. 6, 2013

Related U.S. Application Data

(63) Continuation of application No. PCT/JP2010/063039, filed on Aug. 2, 2010.

(51) Int. Cl.
*G06K 9/00* (2006.01)
*G06K 9/36* (2006.01)

(52) U.S. Cl.
USPC .......................................... 382/232; 382/103

(58) Field of Classification Search
USPC .......................................... 382/103, 232–253
See application file for complete search history.

(56) References Cited

U.S. PATENT DOCUMENTS

| 5,208,673 | A | 5/1993 | Boyce |
| 8,213,736 | B2 | 7/2012 | Toyoda et al. |
| 8,233,706 | B2 | 7/2012 | Shimizu et al. |
| 8,254,636 | B2 | 8/2012 | Tsuruta et al. |
| 2006/0088222 | A1* | 4/2006 | Han et al. ................ 382/232 |
| 2011/0228167 | A1 | 9/2011 | Sasaki |

FOREIGN PATENT DOCUMENTS

| JP | 5-236302 | 9/1993 |
| JP | 6-62283 | 3/1994 |
| JP | 2002-10106 | 1/2002 |
| WO | WO 2008/020487 A1 | 2/2008 |
| WO | WO 2009/060633 A1 | 5/2009 |
| WO | WO 2009/101693 A1 | 8/2009 |
| WO | WO 2010/064316 A1 | 6/2010 |

OTHER PUBLICATIONS

Sendur, Bivariate Shrinkage with Local Variance Estimation, Dec. 2002, IEEE.*
International Search Report of Corresponding PCT Application PCT/JP2010/063039 mailed Sep. 21, 2010.

* cited by examiner

*Primary Examiner* — Alex Liew
(74) *Attorney, Agent, or Firm* — Staas & Halsey LLP (57) ABSTRACT

An image processing apparatus includes a reducing unit that reduces an input image chronologically input as moving images and accumulates a reduced image of the input image as a first reduced image in a predetermined memory. The image processing apparatus further includes a generating unit that generates, as a second reduced image, one reduced image from multiple first reduced images accumulated in the memory. The image processing apparatus further includes a smoothing unit that smooths level values of a pixel included in the second reduced image and pixels surrounding the pixel with respect to each of multiple ranges set according to the width of level values of pixels. The image processing apparatus further includes a synthesizing unit that synthesizes multiple range-by-range results of the smoothing on the basis of the input images. The image processing apparatus further includes an output unit that outputs a synthesized image as an output image.

3 Claims, 6 Drawing Sheets

IMAGE PROCESSING APPARATUS AND IMAGE PROCESSING METHOD

CROSS-REFERENCE TO RELATED APPLICATION

This application is a continuation of International Application No. PCT/JP2010/063039, filed on Aug. 2, 2010, and designating the U.S., the entire contents of which are incorporated herein by reference.

FIELD

The embodiments discussed herein are directed to an image processing apparatus, a recording medium, and an image processing method.

BACKGROUND

There is known a technology of using a low-pass filter (LPF) to remove noise of a high-frequency component included in an image.

An example of this technology, there is an edge-preserving type image processing apparatus. With respect to each of LPFs used in the edge-preserving type image processing apparatus, a different range of level values is set as a passage range of level values of pixels enabled to pass through the LPF. The edge-preserving type image processing apparatus inputs an image to the LPFs, and smooths the image by performing convolution operation between a level value of each pixel and level values of pixels surrounding the pixel with respect to each of output results output from the LPFs. Then, the edge-preserving type image processing apparatus adopts, out of results of the smoothing that the respective output results from the LPFs are smoothed, a result of the smoothing obtained from the output result from an LPF that admits a level value of a pixel included in the input image as the passage range as a level value of an output pixel. Thus, the edge-preserving type image processing apparatus removes a high-frequency component while preserving the edge of the input image.

As another example, there is a reduced-image using type image processing apparatus that generates an output image by synthesizing respective results of smoothing obtained by LPFs from a reduced image of a previously-input frame in a moving image sequence which has been input to the apparatus and a newly-input frame. This reduced-image using type image processing apparatus uses a reduced image of a previous frame at the time of smoothing an input image, and therefore can reduce a processing amount of each LPF while retaining the advantages of the above-described edge-preserving type image processing apparatus.

As still another example, there is a complex type noise reduction device that uses a frame-cyclic type noise reduction device and a non-cyclic type filter noise reduction device. For example, when any image motion between frames has not been detected, and a signal level of an image signal input to the device is low, the complex type noise reduction device performs noise reduction using the frame-cyclic type noise reduction device. Furthermore, when an image motion between frames has been detected, the complex type noise reduction device performs noise reduction using the non-cyclic type filter noise reduction device. In this manner, the complex type noise reduction device uses an optimal noise reduction method according to the presence or absence of a motion in an image signal and the strength of the image signal.

Patent document 1: International Publication Pamphlet No. WO 2008/020487
Patent document 2: International Publication Pamphlet No. WO 2009/060633
Patent document 3: Japanese Laid-open Patent Publication No. 2002-010106

However, the above-described conventional technologies have a problem that the memory capacity is enlarged when flicker of a low-frequency component occurring between frames of moving images, i.e., temporal low-frequency noise is reduced.

For example, in the case of the reduced-image using type image processing apparatus, noise of a high-frequency component which is prone to attract people's attention is removed, and as a result, flicker of a low-frequency component occurring between frames of moving images becomes prominent. Furthermore, in the case of the complex type noise reduction device, an image acquired from an image signal is averaged with previously-acquired multiple images. To perform the averaging, previous temporally-successive frames are accumulated, and therefore, a large-capacity memory has to be adopted.

SUMMARY

According to an aspect of an embodiment, an image processing apparatus includes: a memory; and a processor coupled to the memory. The processor executes a process including: reducing multiple input images chronologically input as moving images and accumulating respective reduced images of the multiple input images in a predetermined memory; generating one reduced image from the reduced images accumulated in the memory; smoothing level values of a pixel included in the one reduced image and pixels surrounding the pixel with respect to each of multiple ranges set according to the width of level values of pixels; synthesizing multiple range-by-range results of the smoothing on the basis of the input images; and outputting an image synthesized at the synthesizing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Incidentally, the present invention is not limited to the embodiments. Furthermore, the embodiments can be arbitrarily combined within a scope which does not cause a conflict of processing contents.

[a] First Embodiment

Configuration of Image Processing Apparatus

Figure 1:
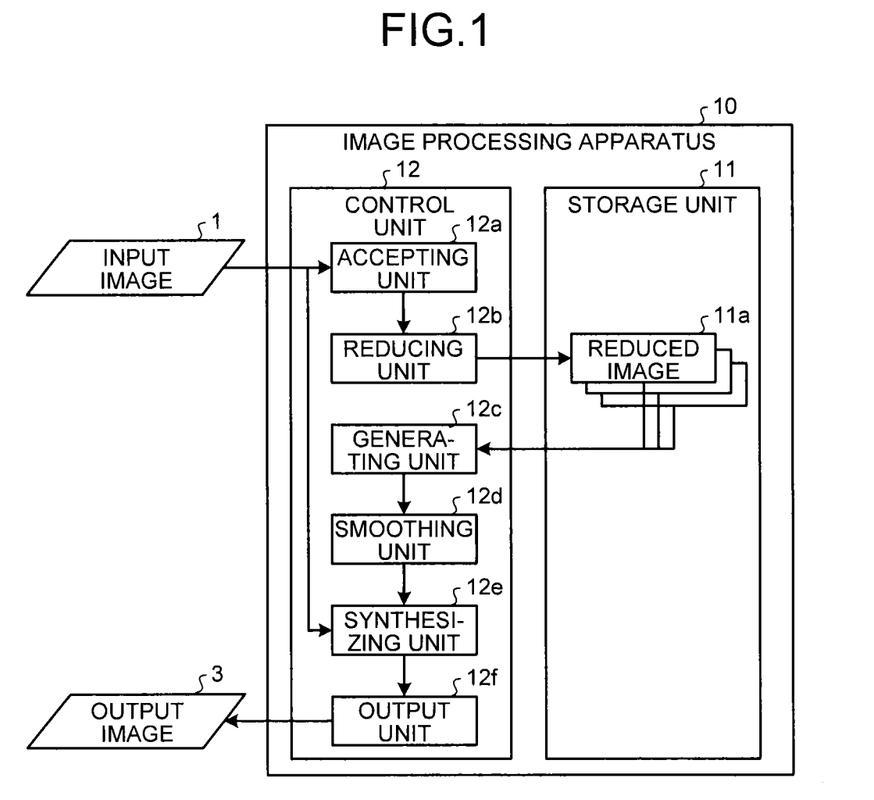
FIG. 1 is a block diagram illustrating a configuration of an image processing apparatus according to a first embodiment.

FIG. 1 is a block diagram illustrating a configuration of an image processing apparatus according to a first embodiment. An image processing apparatus 10 illustrated in FIG. 1 removes a high-frequency component while preserving the edge of an input image 1 chronologically input as a moving image, and achieves three-dimensional noise reduction (NR) for lessening flicker of a low-frequency component occurring between frames of moving images.

In achieving the three-dimensional NR, the image processing apparatus 10 does not enlarge the memory capacity. Namely, the image processing apparatus 10 reduces an image of a previous frame input before the input image 1 subject to the three-dimensional NR, and accumulates the reduced frame image in a storage unit 11. Therefore, the image processing apparatus 10 does not have to accumulate multiple chronologically-input images 1 at original image size. Consequently, the image processing apparatus 10 according to the present embodiment can reduce the memory capacity to a smaller capacity with increasing a reduction rate of input images 1.

Then, the image processing apparatus 10 performs statistical processing among multiple temporally-successive reduced images 11a accumulated in the storage unit 11, thereby generating one reduced image into which the reduced images 11a are integrated. And then, the image processing apparatus 10 synthesizes an input image 1 and results of smoothing obtained by smoothing between level values of a pixel included in the integrated reduced image and its surrounding pixels with respect to each of multiple ranges set according to the width of level values of pixels. Therefore, the image processing apparatus 10 according to the present embodiment can lessen flicker of a low-frequency component occurring between frames of moving images while preserving the edge of the input image 1.

As illustrated in FIG. 1, the image processing apparatus 10 includes the storage unit 11 and a control unit 12. Incidentally, the image processing apparatus 10 can be implemented as a chip mounted on an information processing apparatus, or can be implemented as package software installed in an information processing apparatus.

The storage unit 11 is, for example, a semiconductor memory device such as a random access memory (RAM), a read-only memory (ROM), and a flash memory. Incidentally, the storage unit 11 is not limited to any of the above-mentioned semiconductor memory devices, and can be a memory device such as a hard disk and an optical disk.

The storage unit 11 stores therein an image processing program to be executed by the control unit 12 as well as various programs such as an operating system (OS). Furthermore, the storage unit 11 stores therein data for execution of a program to be executed by the control unit 12; for example, the storage unit 11 stores therein a reduction rate used in reduction by a reducing unit 12b to be described later and a filter size used in smoothing by a smoothing unit 12d to be described later, etc. In addition, the storage unit 11 stores therein reduced images 11a as illustrated in FIG. 1.

The reduced images 11a are a set of image data of reduced input images 1. Each time an input image 1, which is a frame of a moving image, has been accepted by an accepting unit 12a to be described later, the reducing unit 12b reduces the input image 1 and accumulates the reduced input image 1 as the reduced image 11a. Incidentally, the reduced images 11a do not always have to be accumulated permanently; the reduced images accumulated can be sequentially erased in chronological order of frames that are no longer used by a generating unit 12c to be described later. For example, in the present embodiment, the generating unit 12c uses reduced images of previous three frames before the latest frame, and reduced images of older frames than the three frames are erased.

The control unit 12 is, for example, an integrated circuit, such as an ASIC (Application Specific Integrated Circuit) and an FPGA (Field Programmable Gate Array), or an electronic circuit, such as a CPU (Central Processing Unit) and an MPU (Micro Processing Unit).

The control unit 12 includes an internal memory for storing programs defining various processing procedures and control data, and performs various processing by using these. As illustrated in FIG. 1, the control unit 12 includes the accepting unit 12a, the reducing unit 12b, the generating unit 12c, the smoothing unit 12d, a synthesizing unit 12e, and an output unit 12f.

The accepting unit 12a is a processing unit that accepts an input image 1 chronologically input as a moving image. As an example, the accepting unit 12a accepts an input image 1, which is a frame of a moving image, via a predetermined network, such as the Internet, a LAN (Local Area Network), and a VPN (Virtual Private Network). As another example, the accepting unit 12a accepts an input image 1, which is a frame of a moving image, via an image pickup device, such as a camera. Incidentally, here, there is assumed a case where an input image 1 accepted by the accepting unit 12a is directly input to the subsequent reducing unit 12b; alternatively, it can be configured to accumulate the input image 1 in the storage unit 11.

In the present embodiment, there is assumed a case where the accepting unit 12a accepts a moving image sequence represented in YCbCr color system with a streaming method at a predetermined frame rate; for example, the accepting unit 12a accepts one frame every $\frac{1}{30}$ seconds. In this case, out of a luminance component Y and two chrominance components Cb and Cr, the Y component, i.e., the luminance component is an object to be processed by subsequent functional units. Incidentally, here, out of YCbCr components, a Y component is a processing object; however, the other components can be taken as a processing object, and, furthermore, this can apply equally to an image represented in another color system, such as RGB.

The reducing unit 12b is a processing unit that reduces an input image 1 accepted by the accepting unit 12a. As an example, each time the accepting unit 12a has accepted an input image 1, the reducing unit 12b reduces the input image 1 at a predetermined reduction rate, for example, at a reduction rate of $\frac{1}{64}$, i.e., reduces the horizontal and vertical size of the input image 1 by $\frac{1}{8}$. Then, the reducing unit 12b accumulates the reduced input image 1 in the storage unit 11. Incidentally, in the reduction of an input image 1, a general image reduction method, such as the bilinear method or the bicubic method, can be applied.

Figure 2:
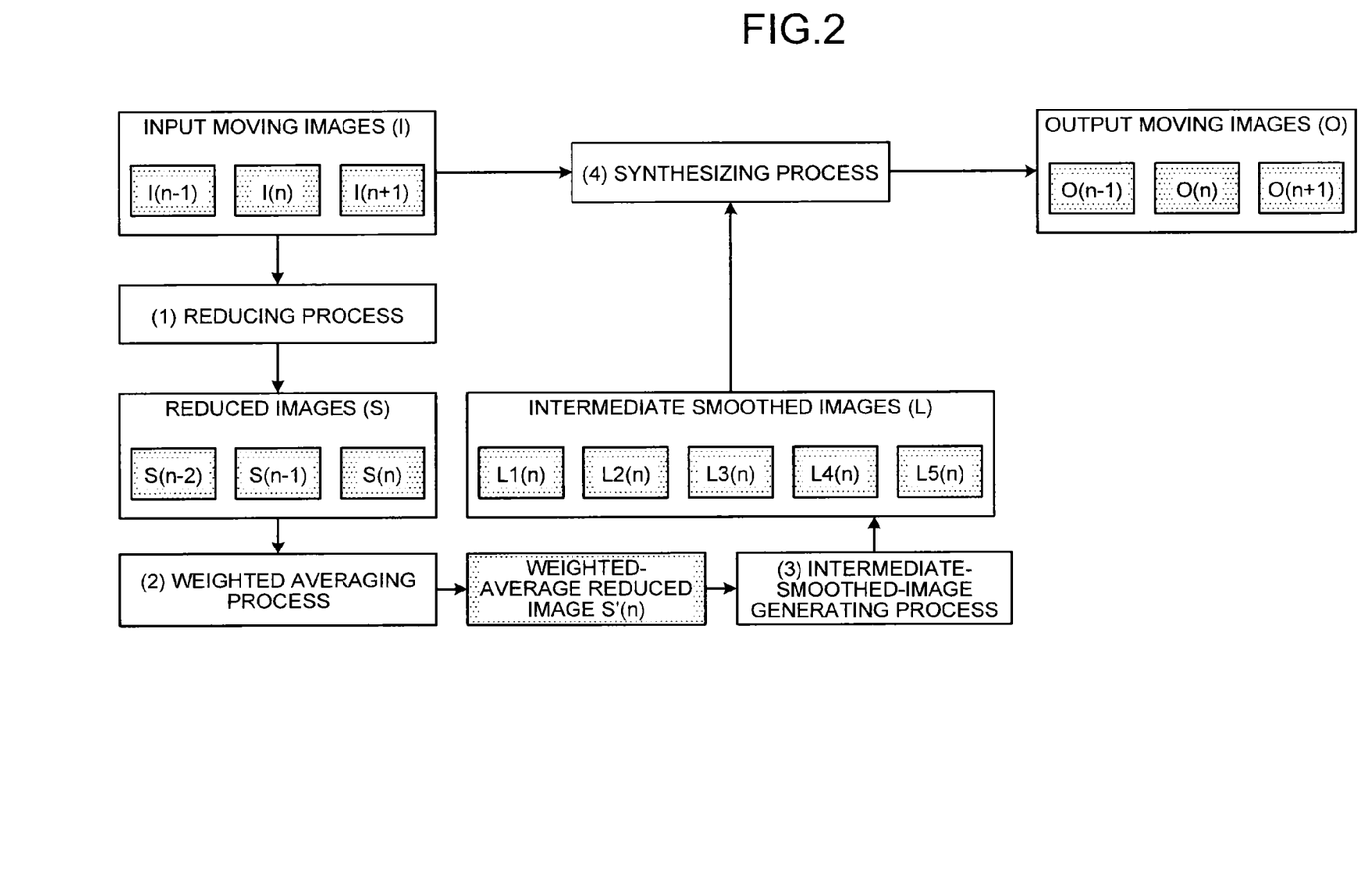
FIG. 2 is a diagram illustrating an example of the flow of data processed by functional units of the image processing apparatus.

FIG. 2 is a diagram illustrating an example of the flow of data processed by the functional units of the image processing apparatus. In the example illustrated in FIG. 2, there is assumed a case where when the image processing apparatus has accepted input moving images I in the order of an (n−2)th frame, an (n−1)th frame, an nth frame, and an (n+1)th frame, the image processing apparatus performs three-dimensional NR on the (n+1)th frame. Reference codes I(n−1), I(n), and I(n+1) illustrated in FIG. 2 denote an (n−1)th-accepted input image, an nth-accepted input image, and an (n+1)th-accepted input image, respectively. Reference codes S(n−2), S(n−1), and S(n) illustrated in FIG. 2 denote a reduced image of the (n−1)th frame, a reduced image of the nth frame, and a reduced image of the (n+1)th frame, respectively.

As illustrated in (1) of FIG. 2, when the accepting unit 12a has accepted an input image I(n−2), the reducing unit 12b reduces the input image I(n−2). Likewise, the reducing unit 12b sequentially reduces input images I(n−1) and I(n). As a result, reduced images S(n−2), S(n−1), and S(n) are obtained. The reduced images S(n−2), S(n−1), and S(n) obtained in this manner are sequentially accumulated in the storage unit 11 by the reducing unit 12b.

Incidentally, here, there is described the case where each time the accepting unit 12a has accepted an input image I, the input image I is reduced; however, an input image I does not always have to be reduced each time the input image I has been accepted. For example, it can be configured to reduce an input image I each time a predetermined number of frames of moving images have been accepted or each time a predetermined period of time has passed.

The generating unit 12c is a processing unit that generates one reduced image from multiple reduced images accumulated in the storage unit 11. Namely, the generating unit 12c weights reduced images accumulated in the storage unit 11 in such a manner that the temporally closer a frame is to latest input image, the more heavily a reduced image of the frame is weighted, and then performs weighted averaging on the reduced images, thereby generating a weighted-average reduced image. Incidentally, here, there is illustrated the case of weighted averaging among three reduced images obtained by reducing previous three input images before the latest input image as described in the explanation of the storage unit 11; however, the image processing apparatus discussed herein is not limited to this. Namely, the image processing apparatus can perform weighted averaging among any number of reduced images of previous frames.

As illustrated in (2) of FIG. 2, when the reduced image S(n) has been obtained, the generating unit 12c performs weighted averaging on all pixels among the three reduced images S(n−2), S(n−1), and S(n), thereby generating a weighted-average reduced image S'(n). The weighted-average reduced image S'(n) is a reduced image containing changes between temporally-successive low-frequency components, i.e., changes between n−2, n−1, and n.

Here, the generating unit 12c sets weight coefficients a, b, and c in "S'(n)=S(n)×a+S(n−1)×b+S(n−2)×c", an equation for calculation of the weighted-average reduced image S'(n), so as to meet "a>b>c" and "a+b+c=1". As an example, the generating unit 12c sets the weight coefficients at a ratio of "a:b:c=3:2:1". In this manner, a weight coefficient of the reduced image S(n) of the closest frame I(n) to the input image I(n+1), which is an processing object, is highest. And, a weight coefficient of the reduced image S(n−1) of the second closest frame I(n−1) to the input image I(n+1) is second highest. And then, a weight coefficient of the reduced image S(n−2) of the farthest frame I(n−2) from the input image I(n+1) is lowest.

Consequently, even when there is a scene change between the nth frame and the (n−2)th frame or the (n−1)th frame, i.e., the scene of the image of the nth frame is changed from that of the (n−2)th frame or the (n−1)th frame, an effect of the image before the scene change can be reduced. Therefore, when multiple intermediate smoothed images L generated from the weighted-average reduced image S'(n) and the input image I(n+1) are synthesized, it is possible to prevent blurring of an output image O(n+1).

To return to the explanation of FIG. 1, the smoothing unit 12d is a processing unit that smooths level values of a pixel included in a weighted-average reduced image and pixels surrounding the pixel with respect to each of multiple ranges set according to the width of level values of pixels by using a low-pass filter (LPF).

To explain this, the smoothing unit 12d stratifies pixels of a weighted-average reduced image generated by the generating unit 12c into five planes of tone levels ranging from 0 to 255. It is assumed that the stratified five ranges of level values are 0 to 84, 42 to 128, 85 to 160, 129 to 212, and 161 to 255, respectively.

Then, the smoothing unit 12d calculates a value of a processing target pixel by averaging values of pixels falling under a level value range among surrounding pixels around each pixel of the weighted-average reduced image. The "surrounding pixels" here means multiple pixels around a processing target pixel determined according to a filter size. At this time, out of pixels within the filter size, a pixel which does not fall under the processing target level value range the smoothing unit 12d does not use in the calculation of an average. When there is no pixel falling under the level value range among the pixels within the filter size, for the sake of convenience, the smoothing unit 12d calculates an average in the level value range, for example, "42" in the level value range of 0 to 84, as a value of a processing target pixel.

In this manner, as illustrated in (3) of FIG. 2, the smoothing unit 12d performs multiple smoothing on pixels in the weighted-average reduced image S'(n) with respect to each of the multi-stratified level value ranges. By performing the smoothing, the smoothing unit 12d generates multiple intermediate smoothed images $L1(n)$ to $L5(n)$ which are intermediate data in the course of the three-dimensional NR performed by the image processing apparatus 10. The technology disclosed in International Publication Pamphlet No. WO 2009/060633 can be applied to the generation of the multiple intermediate smoothed images $L1(n)$ to $L5(n)$. Incidentally, when the smoothing unit 12d performs the multiple smoothing, the smoothing unit 12d can sequentially perform the smoothing by using one LPF, or can concurrently perform the smoothing by using multiple LPFs.

Incidentally, the number of planes stratified by the smoothing unit 12d is not limited to "5", and respective level value ranges of the planes are not limited to the above-described values. The number of stratified planes just has to be multiple, and respective level value ranges just have to be set by values that 0 to 255 tones are divided by the number of planes.

The synthesizing unit 12e is a processing unit that synthesizes multiple range-by-range results of smoothing by the smoothing unit 12d on the basis of an input image. As illustrated in (4) of FIG. 2, in a case of generating a smoothed image of the (n+1)th frame, the synthesizing unit 12e acquires one or more of the intermediate smoothed images $L1(n)$ to $L5(n)$ that the weighted-average reduced image S'(n) is smoothed by the smoothing unit 12d with respect to each of the level value ranges. Then, the synthesizing unit 12e generates a smoothed image by synthesizing the acquired intermediate smoothed images on the basis of an input image I(n+1).

As an example, in a case of synthesis of processing target pixels of which the level value is 100 in the input image I(n+1), the synthesizing unit 12e performs the following process. That is, the synthesizing unit 12e acquires a plane including a level value of 100 out of the five intermediate smoothed images L1(n) to L5(n) of the weighted-average reduced image S'(n). For example, the synthesizing unit 12e acquires L2(n) of which the pixel level values are in the range of 42 to 128 and the average level value is 90 and L3(n) of which the pixel level values are in the range of 85 to 160 and the average level value is about 120. Then, the synthesizing unit 12e calculates a distance "100−90=10" between L2(n) and the input image I(n+1) and a distance "120−100=20" between L3(n) and the input image I(n+1). And then, on the basis of the calculated distances, the synthesizing unit 12e sets a weight to be added to L2(n) at a closer distance from the input image I(n+1) to be larger than that of L3(n). For example, the synthesizing unit 12e synthesizes the intermediate smoothed images L2(n) and L3(n) of the weighted-average reduced image S'(n) by performing an interpolation operation at a ratio of "L2(n):L3(n)=2:1", thereby generating a smoothed image. As an example of the synthesis by the interpolation operation, the synthesizing unit 12e just has to acquire four pixels located near the input image I(n+1) from each of L2(n) and L3(n), i.e., a total of eight pixels and perform a cubic interpolation operation. The technology disclosed in International Publication Pamphlet No. WO 2009/060633 can be applied to the synthesis of the intermediate smoothed images L1(n) to L5(n) on the basis of the input image I(n+1).

Furthermore, as for the input image I(n+2), i.e., a frame subsequent to the (n+1)th frame, the synthesizing unit 12e performs the same process by replacing the (n+1)th frame with the subsequent frame. Incidentally, in the present embodiment, a Y component is a processing object, and a smoothed image is generated from the intermediate smoothed images of the weighted-average reduced image S'(n) and an image of the (n+1)th frame; this generated smoothed image is preferably treated as a processing result of the (n+1)th frame. Therefore, when intermediate smoothed images of the nth frame are generated by setting a Y component as a processing object, the other components, i.e., CbCr components are extracted from the (n+1)th frame and synthesized. Then, another component to be synthesized with the processing target component at the time of generation of intermediate smoothed images of a weighted-average reduced image S'(n) is preferably the (n+1)th frame, i.e., it is preferably synthesized with another component of a frame other than the nth frame.

The output unit 12f is a processing unit that outputs a smoothed image synthesized by the synthesizing unit 12e as an output image 3. In the example illustrated in FIG. 2, the output unit 12f outputs the smoothed image into which the five intermediate smoothed images L1(n) to L5(n) of the weighted-average reduced image S'(n) have been synthesized on the basis of the input image I(n+1) as an output image O(n+1). A destination to which the output image is output is, for example, a display device that displays thereon an image. As another example of the destination, there is a subsequent functional unit (not illustrated), such as a functional unit that performs a dynamic range correction. As still another example of the destination, there are an external storage medium or storage unit and an external device connected to the image processing apparatus 10 via a network.

Flow of Process

Figure 3:
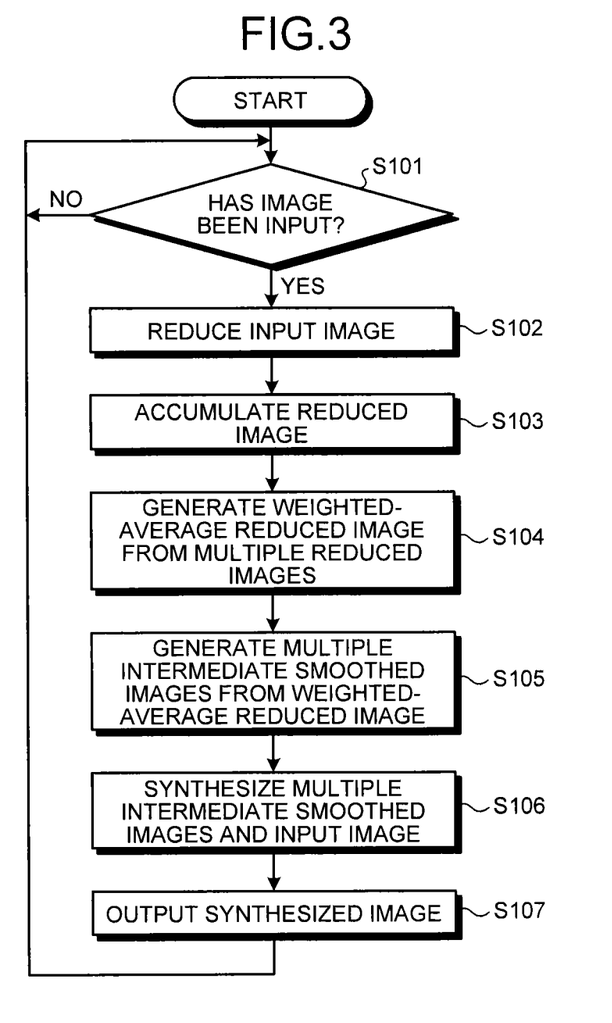
FIG. 3 is a flowchart illustrating a procedure of a three-dimensional noise reduction process according to the first embodiment.

FIG. 3 is a flowchart illustrating a procedure of a three-dimensional noise reduction process according to the first embodiment. The three-dimensional noise reduction process is repeatedly performed recursively as long as electrical power is supplied to the image processing apparatus 10.

As illustrated in FIG. 3, when an input image 1, which is a frame of a moving image, has been accepted by the accepting unit 12a (YES at Step S101), the reducing unit 12b reduces the input image 1 accepted by the accepting unit 12a (Step S102). Then, the reducing unit 12b accumulates the reduced input image 1 in the storage unit 11 (Step S103).

Then, the generating unit 12c performs weighted averaging on all pixels among multiple reduced images accumulated in the storage unit 11, thereby generating a weighted-average reduced image (Step S104). After that, the smoothing unit 12d performs multiple smoothing on pixels in the weighted-average reduced image with respect to each of multi-stratified level value ranges, thereby generating multiple intermediate smoothed images (Step S105).

Then, the synthesizing unit 12e synthesizes multiple range-by-range results of the smoothing by the smoothing unit 12d on the basis of the input image, thereby generating a smoothed image (Step S106). And then, the output unit 12f outputs the smoothed image generated by the synthesizing unit 12e as an output image 3 (Step S107).

After that, return to Step S101, the image processing apparatus 10 repeatedly performs the processes at Steps S101 to S107.

Effects of First Embodiment

As described above, the image processing apparatus 10 according to the present embodiment reduces a previous frame input before an input image 1 subject to three-dimensional NR, and accumulates the reduced frame in the storage unit 11. Therefore, in the image processing apparatus 10 according to the present embodiment, multiple input images 1 input in chronological order do not have to be accumulated at original image size. Consequently, the image processing apparatus 10 according to the present embodiment can make the memory capacity smaller with increasing a reduction rate of the input images 1. Then, the image processing apparatus 10 according to the present embodiment performs statistical processing among multiple chronologically-successive reduced images 11a accumulated in the storage unit 11, thereby generating one reduced image into which the reduced images 11a are integrated. And then, the image processing apparatus 10 according to the present embodiment synthesizes results of smoothing obtained by smoothing between level values of a pixel included in the integrated reduced image and its surrounding pixels with respect to each of multiple ranges set according to the width of level values of pixels on the basis of the input image 1. Therefore, the image processing apparatus 10 according to the present embodiment can lessen flicker of a low-frequency component occurring between frames of moving images while preserving the edge of input images 1. Thus, the image processing apparatus 10 according to the present embodiment can reduce temporal low-frequency noise without enlarging the memory capacity.

Here we discuss the effect of a combination of a reduced-image using type image processing apparatus and a complex type noise reduction device, which are described in the prior art. The reduced-image using type image processing apparatus generates output images of an (n+1)th frame and an (n+2)th frame by using results output from LPFs with different level values with respect to an nth frame. The reduced-image using type image processing apparatus uses the LPF results of the nth frame in the generation of output images of the (n+1)th frame and the (n+2)th frame, thereby omitting the LPFs filtering with respect to the (n+1)th frame and the (n+2)th frame to aim for the effect of reducing a processing amount and a processing time. In this manner, if it is intended to reduce a processing amount and a processing time, the reduction effect gets higher with increase in the use of the LPF results of the nth frame.

When a technology of averaging images in a temporal direction like the complex type image processing apparatus is combined with the reduced-image using type image processing apparatus having the concept as described above, only the following configuration arises. Namely, when the two are combined, the combined apparatus can only be configured to directly accumulate an input image, and average input images accumulated, and reduce the averaged input image, and let the reduced image through the LPFs with different level values, and then synthesize respective images filtered by the LPFs and the input image. In this manner, even in the case of the combination of the reduced-image using type image processing apparatus and the complex type image processing apparatus, it is not possible to satisfy both reduction of the memory capacity and three-dimensional noise reduction.

On the other hand, the image processing apparatus 10 according to the present embodiment reduces an input image and then accumulates the reduced image, and averages accumulated reduced images of multiple frames instead of directly accumulating an input image and averaging accumulated input images thereby enlarging the memory capacity. Accordingly, the image processing apparatus 10 accumulates a reduced image having the smaller data size than that of an original image, and therefore can reduce the memory capacity. Furthermore, the image processing apparatus 10 inputs a post-reduction average image obtained by averaging the reduced images to the LPFs, and therefore can reduce temporal low-frequency noise.

Moreover, the image processing apparatus 10 according to the present embodiment weights multiple reduced images in such a manner that the closer a frame is to an input image, the more heavily a reduced image of the frame is weighted, and then performs weighted averaging, thereby generating a weighted-average reduced image. Consequently, even when there is a scene change, the image processing apparatus 10 according to the present embodiment can reduce an effect of an image before the scene change. Therefore, when multiple intermediate smoothed images generated from the weighted-average reduced image and the input image are synthesized, the image processing apparatus 10 according to the present embodiment can prevent blurring of an output image.

[b] Second Embodiment

The embodiment of the image processing apparatus according to the present invention is described above; besides the above-described embodiment, the present invention can be embodied in various different forms. The other embodiments included in the present invention are described below.

Weighting Application Example 1

In the above first embodiment, there is described the example where a relation among the weight coefficients a, b, and c in the equation for calculation of the weighted-average reduced image S'(n) is "a>b>c"; the image processing apparatus according to the present invention is not limited to this. For example, in principle, the closer a frame is to an input image, the larger a weight coefficient of a reduced image of the frame is set; however, a weight coefficient of a reduced image meeting a specific condition can be set small.

As an example, the image processing apparatus according to the present invention can weight multiple reduced images in such a manner that the larger difference in average level value from a reduced image of the closest frame to an input image a reduced image has, the less heavily the reduced image is weighted, and then perform weighted averaging on the reduced images.

To take the example illustrated in FIG. 2, an image processing apparatus discussed herein calculates weight coefficients a, b, and c in the equation for calculation of a weighted-average reduced image S'(n) on the basis of respective average level values of S(n), S(n−1), and S(n−2), i.e., an average level value of all pixels in each reduced image. Incidentally, here, an average level value of S(n) is denoted by Ave(n), an average level value of S(n−1) is denoted by Ave(n−1), and an average level value of S(n−2) is denoted by Ave(n−2).

Here, the image processing apparatus calculates a difference between the average level value Ave(n) of the reduced image S(n) of the closest frame to the input image and the average level value Ave(n−1) of the reduced image S(n−1) of the second closest frame. Furthermore, the image processing apparatus calculates a difference between the average level value Ave(n) of the reduced image S(n) of the closest frame to the input image and the average level value Ave(n−2) of the reduced image S(n−2) of the farthest frame from the input image. Then, the image processing apparatus sets a weight coefficient applied to one of the reduced images corresponding to the smaller difference of the calculated differences, |Ave(n)−Ave(n−1)| and |Ave(n)−Ave(n−2)|, to be larger than that is applied to the other reduced image. At this time, if the difference in average level value is equal to or greater than a predetermined threshold, for example, 60, a weight coefficient can be set to zero.

Figure 4:
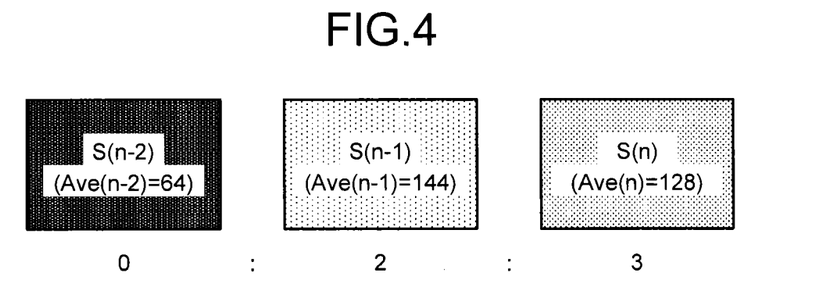
FIG. 4 is a diagram for explaining a weighting application example.

FIG. 4 is a diagram for explaining a weighting application example. In the example illustrated in FIG. 4, |Ave(n)−Ave(n−1)| is 16, and |Ave(n)−Ave(n−2)| is 64. In this case, |Ave(n)−Ave(n−2)| is greater than the threshold of 60, so the image processing apparatus sets the weight coefficient c of the reduced image S(n−2) to zero. Furthermore, |Ave(n)−Ave(n−1)| is less than |Ave(n)−Ave(n−2)|, so the image processing apparatus sets the weight coefficient b of the reduced image S(n−1) to be larger than that of the reduced image S(n−2). Accordingly, the image processing apparatus sets the weight coefficients a, b, and c at a ratio of "a:b:c=3:2:0".

In this manner, the image processing apparatus weights reduced images in such a manner that the larger difference in average level value from a reduced image of the closest frame to an input image a reduced image has, the less heavily the reduced image is weighted, and then performs weighted averaging, thereby achieving the following effects. As an example, when there is an intense motion between images of frames, the image processing apparatus can set a weight coefficient of a reduced image having a low correlation with an input image low. As another example, even when there is a scene change, the image processing apparatus can set a weight coefficient of a reduced image before the scene change low.

Weighting Application Example 2

Furthermore, when the image processing apparatus changes respective weight coefficients to be applied to multiple reduced images with respect to each pixel included in the reduced images to perform weighted averaging, the image processing apparatus can perform the following process. That is, the image processing apparatus weights reduced images in such a manner that the larger difference in level value from a pixel included in a reduced image of the closest frame to an input image a pixel included in a reduced image has, the less heavily the reduced image is weighted, and then performs weighted averaging on the reduced images.

Figure 5:
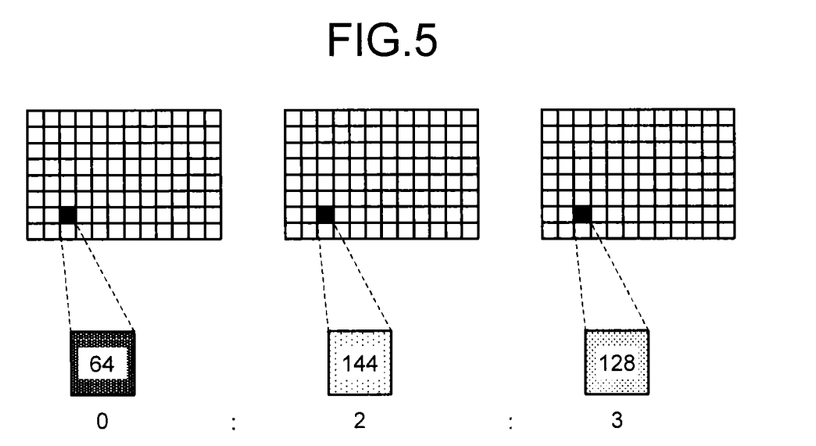
FIG. 5 is a diagram for explaining another weighting application example.

Namely, the image processing apparatus uses a different calculation equation from that is in the first embodiment as an equation for calculation of a weighted-average reduced image S'(n). As an example, the image processing apparatus calculates a weighted-average reduced image S'(n) from the calculation equation "S'(n,x,y)=S(n(x,y))×a'+S(n−1(x,y))×b'+S(n−2(x,y))×c'". The image processing apparatus calculates the weight coefficients a', b', and c' according to S(n(x, y)), S(n−1(x, y)), and S(n−2(x, y)). In other words, the image processing apparatus sets a relatively larger weight coefficient to a pixel included in a reduced image having a smaller difference from S(n(x, y)), and sets a relatively smaller weight coefficient to a pixel included in a reduced image having a larger difference from S(n(x, y)).

FIG. 5 is a diagram for explaining a weighting application example. To take black-painted pixels illustrated in FIG. 5 as an example, |S(n(x, y))−S(n−1(x, y))| is 16, and |S(n(x, y))−S(n−2(x, y))| is 64. In this case, |S(n(x, y))−S(n−2(x, y))| is greater than the threshold of 60, so the image processing apparatus sets the weight coefficient c' of the reduced image S(n−2(x, y)) to zero. Furthermore, |S(n(x, y))−S(n−1(x, y))| is less than |S(n(x, y))−S(n−2(x, y))|, so the image processing apparatus sets the weight coefficient b' of the reduced image S(n−1(x, y)) to be larger than that of the reduced image S(n−2(x, y). Accordingly, the image processing apparatus sets the weight coefficients a', b', and c' at a ratio of "a':b':c'=3:2:0".

Consequently, when there is an intense motion between images of frames, the image processing apparatus can set a weight coefficient of a reduced image having a low correlation with an input image low. Furthermore, even when there is a scene change, the image processing apparatus can set a weight coefficient of a reduced image before the scene change low.

Incidentally, here, there is described the cases of the execution of the weighting application examples 1 and 2 separately; alternatively, the weighting application examples 1 and 2 can be executed in combination. In this case, an equation for calculation of a weighted-average reduced image S'(n) used by the image processing apparatus is "S'(n(x, y))=S(n(x, y))×a×a'+S(n−1(x, y))×b×b'+S(n−2(x, y))×c×c'". Then, the image processing apparatus calculates the weight coefficients a, b, and c on the basis of Ave(n), Ave(n−1), and Ave(n−2) as described above. Furthermore, the image processing apparatus calculates the weight coefficients a', b', and c' on the basis of S(n(x, y)), S(n−1(x, y)), and S(n−2(x, y)) as described above.

Application to Client Server System

Figure 6:
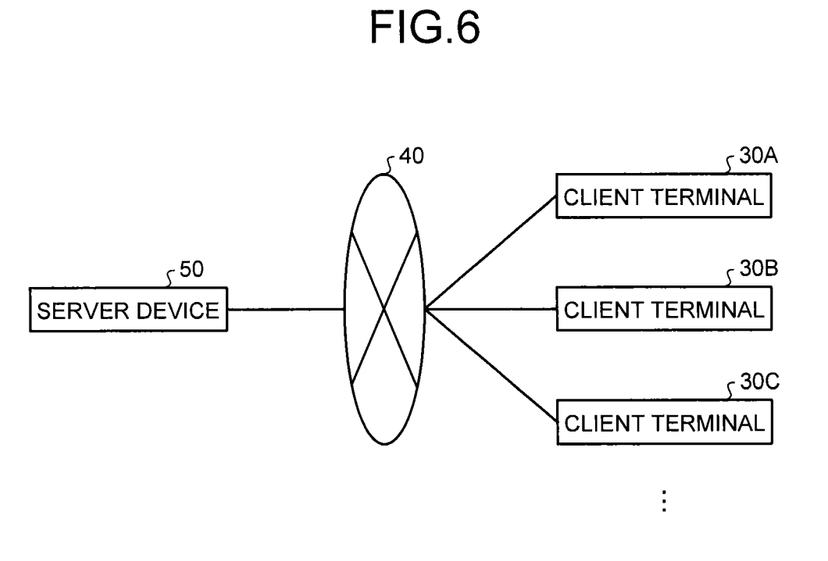
FIG. 6 is a diagram for explaining an example of application to a client server system.

The image processing apparatus 10 described in the first embodiment can be suitably applied to a client server system. FIG. 6 is a diagram for explaining an example of application to a client server system. The client server system illustrated in FIG. 6 includes client terminals 30A to 30C and a server device 50; the client terminals 30A to 30C are connected to the server device 50 via a network 40. Incidentally, the client terminals 30A to 30C are collectively referred to as a client terminal 30 unless otherwise described separately. The server device 50 is a cloud in this client server system, and the client terminal 30 transmits a moving image to the cloud server device 50. The server device 50 can execute three-dimensional NR of the moving image transmitted from the client terminal 30, and store therein an output image and send a response to the client terminal 30.

Division and Integration of Functional Units

Components of each apparatus illustrated in the drawings do not always have to be physically configured as illustrated in the drawings. Namely, the specific forms of division and integration of components of each apparatus are not limited to those illustrated in the drawings, and all or some of the components can be configured to be functionally or physically divided or integrated in arbitrary units depending on respective loads and use conditions, etc. For example, the accepting unit 12a, the reducing unit 12b, the generating unit 12c, the smoothing unit 12d, the synthesizing unit 12e, or the output unit 12f can be configured as an external device and be connected to the image processing apparatus via a network. Furthermore, other devices can have the accepting unit 12a, the reducing unit 12b, the generating unit 12c, the smoothing unit 12d, the synthesizing unit 12e, and the output unit 12f, respectively, and work together by connecting to a network, thereby realizing the functions of the image processing apparatus.

Image Processing Program

Figure 7:
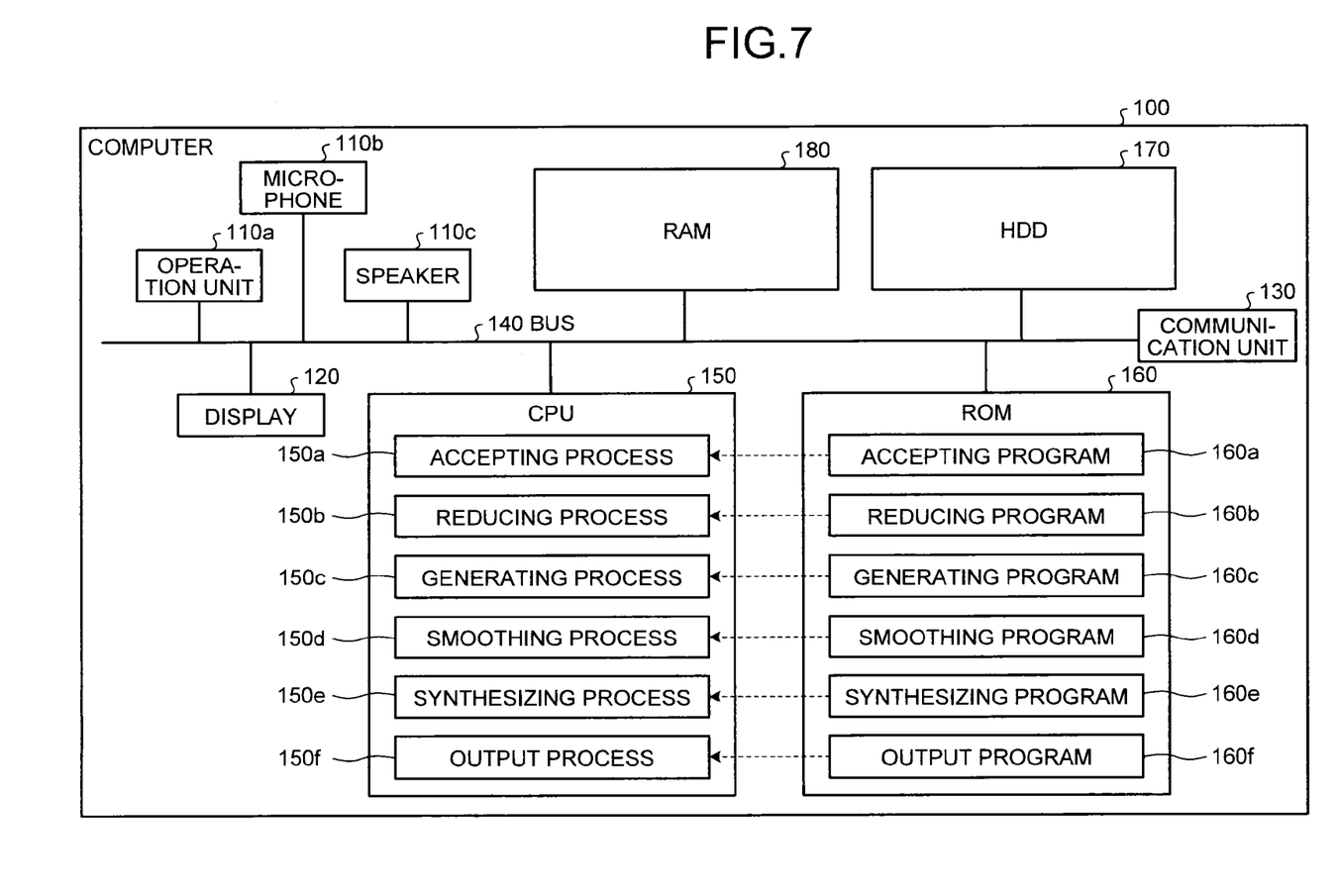
FIG. 7 is a diagram for explaining an example of a computer that executes an image processing program according to a second embodiment.

Various processes described in the above embodiment can be realized by causing a computer, such as a personal computer or a workstation, to execute a program prepared in advance. An example of the computer that executes an image processing program having the same functions as those described in the above embodiment is explained below with reference to FIG. 7. FIG. 7 is a diagram for explaining the example of the computer that executes the image processing program according to a second embodiment.

As illustrated in FIG. 7, a computer 100 in the second embodiment includes an operation unit 110a, a microphone 110b, a speaker 110c, a display 120, and a communication unit 130. Furthermore, the computer 100 includes a CPU 150, a ROM 160, a hard disk drive (HDD) 170, and a random access memory (RAM) 180. These units 110 to 180 are connected via a bus 140.

A control program fulfilling the same functions as the accepting unit 12a, the reducing unit 12b, the generating unit 12c, the smoothing unit 12d, the synthesizing unit 12e, and the output unit 12f described in the first embodiment is stored in the ROM 160 in advance. Namely, as illustrated in FIG. 7, an accepting program 160a, a reducing program 160b, a generating program 160c, a smoothing program 160d, a synthesizing program 160e, and an output program 160f are stored in the ROM 160. These programs 160a to 160f can be arbitrarily integrated or divided just like the components of the image processing apparatus 10 illustrated in FIG. 1. Incidentally, all data stored in the ROM 160 do not always have to be stored in the ROM 160, and it is sufficient if data for each process is stored in the ROM 160.

The CPU 150 reads out these programs 160a to 160f from the ROM 160 and executes the read programs. As a result, the programs 160a to 160f executed by the CPU 150 operate as an accepting process 150a, a reducing process 150b, a generating process 150c, a smoothing process 150d, a synthesizing process 150e, and an output process 150f. These processes 150a to 150f correspond to the accepting unit 12a, the reducing unit 12b, the generating unit 12c, the smoothing unit 12d, the synthesizing unit 12e, and the output unit 12f illustrated in FIG. 1, respectively. Incidentally, all processing units virtually realized on the CPU 150 do not always have to operate on the CPU 150, and it is sufficient if a processing unit for each process is virtually realized. Then, the CPU 150 executes an image processing program by the use of the RAM 180.

Incidentally, the image processing program does not have to be stored in the HDD 170 or the ROM 160 from the beginning. For example, the image processing program can be stored in a "portable physical medium" to be inserted into the computer 100, such as a flexible disk (FD), a CD-ROM, a DVD, a magnet-optical disk, or an IC card. Then, the computer 100 can retrieve the program from the portable physical medium and execute the program. Furthermore, the image processing program can be stored on another computer or a server device which is connected to the computer 100 via a public line, the Internet, a LAN, or a WAN, etc., and the computer 100 can retrieve the program from the computer or server device and execute the program.

According to one aspect of an image processing apparatus discussed in the present application, the image processing apparatus can reduce temporal low-frequency noise without enlarging the memory capacity.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus includes:
a memory; and
a processor coupled to the memory, wherein the processor executes a process comprising:
reducing multiple input images chronologically input as moving images and accumulating respective reduced images of the multiple input images in a predetermined memory;
generating one reduced image from the reduced images accumulated in the memory;
smoothing level values of a pixel included in the one reduced image and pixels surrounding the pixel with respect to each of multiple ranges set according to the width of level values of pixels;
synthesizing multiple range-by-range results of the smoothing on the basis of the input images; and
outputting an image synthesized at the synthesizing, wherein
the generating includes weighting the reduced images in such a manner that the closer a frame is to latest input image, the more heavily a reduced image of the frame is weighted, and includes generating the one reduced image by performing weighted averaging on the reduced images, and
the generating includes weighting the reduced images in such a manner that the larger difference in average level value from a reduced image of the closest frame to latest input image a reduced image has, the less heavily the reduced image is weighted, and includes generating the one reduced image by performing weighted averaging on the reduced images.

2. A non-transitory computer readable recording medium having stored therein an image processing program causing a computer to execute a process comprising:
reducing multiple input images chronologically input as moving images and accumulating respective reduced images of the multiple input images in a predetermined memory;
generating one reduced image from the reduced images accumulated in the memory;
smoothing level values of a pixel included in the one reduced image and pixels surrounding the pixel with respect to each of multiple ranges set according to the width of level values of pixels;
synthesizing multiple range-by-range results of smoothing at the smoothing on the basis of the input images; and
outputting an image synthesized at the synthesizing, wherein
the generating includes weighting the reduced images in such a manner that the closer a frame is to latest input image, the more heavily a reduced image of the frame is weighted, and includes generating the one reduced image by performing weighted averaging on the reduced images, and
the generating includes weighting, when respective weights to be added to the reduced images with respect to each pixel included in the reduced images are changed to perform weighted averaging, the reduced images in such a manner that the larger difference in level value from a pixel included in a reduced image of the closest frame to latest input image a pixel included in a reduced image has, the less heavily the reduced image is weighted, and includes generating the one reduced image by performing weighted averaging on the reduced images.

3. An image processing method used in a client server system including a client terminal and a server device, the image processing method that is implemented by the server device comprising:
reducing, using a processor, multiple input images chronologically input from the client terminal as moving images and accumulating respective reduced images of the multiple input images in a predetermined memory;
generating, using the processor, one reduced image from the reduced images accumulated in the memory;
smoothing, using the processor, level values of a pixel included in the one reduced image and pixels surrounding the pixel with respect to each of multiple ranges set according to the width of level values of pixels;
synthesizing, using the processor, multiple range-by-range results of the smoothing on the basis of the input images; and
outputting a synthesized image to a predetermined storage device, wherein
the generating includes weighting the reduced images in such a manner that the closer a frame is to latest input image, the more heavily a reduced image of the frame is weighted, and includes generating the one reduced image by performing weighted averaging on the reduced images, and
the generating includes weighting, when respective weights to be added to the reduced images with respect to each pixel included in the reduced images are changed to perform weighted averaging, the reduced images in such a manner that the larger difference in level value from a pixel included in a reduced image of the closest frame to latest input image a pixel included in a reduced image has, the less heavily the reduced image is weighted, and includes generating the one reduced image by performing weighted averaging on the reduced images.

* * * * *